United States Patent
Panikatt et al.

(10) Patent No.: US 6,349,333 B1
(45) Date of Patent: Feb. 19, 2002

(54) PLATFORM INDEPENDENT ALARM SERVICE FOR MANIPULATING MANAGED OBJECTS IN A DISTRIBUTED NETWORK MANAGEMENT SYSTEM

(75) Inventors: Sujit Panikatt, Sunnyvale; Emmanuelle Pedron, Campbell, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/206,069

(22) Filed: Dec. 4, 1998

(51) Int. Cl.[7] ............................................. G06F 15/173
(52) U.S. Cl. ........................................ 709/223; 709/224
(58) Field of Search ................................. 709/217, 219, 709/224, 223; 714/4; 707/103, 104, 102

(56) References Cited

U.S. PATENT DOCUMENTS

| | | | |
|---|---|---|---|
| 5,388,189 A | | 2/1995 | Kung |
| 5,473,596 A | | 12/1995 | Garafola et al. |
| 5,726,979 A | | 3/1998 | Henderson et al. |
| 5,787,245 A | | 7/1998 | You et al. |
| 5,828,840 A | | 10/1998 | Cowan et al. |
| 5,923,885 A | | 7/1999 | Johnson et al. |
| 5,926,631 A | | 7/1999 | McGarvey |
| 6,006,016 A | * | 12/1999 | Faigon et al. .................. 714/48 |
| 6,058,420 A | | 5/2000 | Davies |
| 6,085,191 A | * | 7/2000 | Fisher et al. .................... 707/9 |
| 6,098,093 A | | 8/2000 | Bayeh et al. |
| 6,131,118 A | * | 10/2000 | Stupek, Jr. et al. ......... 709/223 |

FOREIGN PATENT DOCUMENTS

| | | |
|---|---|---|
| EP | 398987 | 5/1997 |
| GB | 2254522 | 10/1992 |

OTHER PUBLICATIONS

3com, HP Openview for Windows User Guide for Transcend Management Software, Oct. 1997, Hewlett–Packard Co., pp. 4.17–4.33.

Cisco, Chapter 5: Using Threshold Manager, Cisco Systems Inc., Jan. 1997, pp. 5.1–5.18.

3com, Transcend Enterprise Manager Alarm Management User Guide Version 4.2 for UNIX, 3com Corp., Mar. 1997, pp. 1.1–4.

Sun Microsystems, Soltice Enterprise Manager 2.1: A Technical White Paper, Sun Microsystems, Inc., Jan. 1997, pp. 1–63.

* cited by examiner

*Primary Examiner*—Mehmet B. Geckil
(74) *Attorney, Agent, or Firm*—Kudirka & Jobse, LLP

(57) ABSTRACT

The client portion of a distributed client-server network management system uses an interface designed with, and written in, a platform independent language, such as Java. This allows management application programs to be written in the platform independent language and insures their portability. Further, in accordance with another aspect of the invention, the inventive interface allows a user to query an alarm log while the alarm log record information is cached at the server so that only a small client program is necessary. This program can run on a system with minimal resources, thereby allowing a network manager to manage a network from virtually any location on the network. For example, the client management application could be written as a Java applet which could then be run on any Java-enabled browser. In accordance with still another aspect of the invention, an alarm log can be queried on any user-defined attribute based on relational criteria such as: "greater than", "less than", "equal", "not equal", etc.

21 Claims, 10 Drawing Sheets

PLATFORM INDEPENDENT ALARM SERVICE FOR MANIPULATING MANAGED OBJECTS IN A DISTRIBUTED NETWORK MANAGEMENT SYSTEM

FIELD OF THE INVENTION

This invention relates to network management tools for managing distributed networks and, in particular, to alarm management and alarm servicing tools.

BACKGROUND OF THE INVENTION

Present day telecommunications and information networks have become larger and far more complex than those which have been available only a few years ago. The trend towards increases in size and complexity can be expected to continue at a high rate into the foreseeable future with the proliferation of cellular networks, the development and deployment of global satellite networks, and the expansion of basic wireline networks in developing nations. Both homogeneous and heterogeneous networks are now being connected together by means of the Internet and other inter-network connection mechanisms.

In order to maintain network reliability and an acceptable quality of service, it is necessary to carefully monitor and manage network resources. However, as existing networks grow larger and more complex, network management also becomes more difficult and more complex. The prior art responded by providing automated management tools for reporting network status. These tools allowed network management personnel to improve the quality of service and maintain high network availability and reliability.

Such automated management tools were distributed and generally arranged as client server applications which provided integrated systems for supporting heterogeneous network environments. The client portion of the tools was arranged to have a standard interface which minimized variations of look and feel of the system as seen by the network operations personnel whereas the server portion was designed to operate on different platforms. The distributed architecture allowed the tool to evolve and scale as the networks evolved in size, capabilities, and geographies.

One such distributed network management tool is the Solstice Enterprise Manager™ (Solstice EM) network management system which was developed and is marketed by Sun Microsystems, Inc. This tool has an object-oriented and distributed architecture which consists of a plurality of cooperating components, including applications, libraries, information services, databases, and protocols, each of which performs specific tasks. The managed resources are arranged as a plurality of interconnected nodes and "management agents" running in each node gather information about the resources associated with the node. The information is then forwarded back to a management information server (MIS) which interacts with management applications running in other nodes. The MIS can request and change management parameter values, perform requested actions, and receive and evaluate problem reports (e.g. events, such as SNMP traps and CMIP notifications) that the management agents generate.

Although the MIS and the management agents can communicate with each other via various network management protocols such as Simple Network Management Protocol (SNMP), Common Management Information Protocol (CMIP), or other proprietary/legacy protocols, the Solstice EM™ framework interposes software model representations of managed resources in the MIS between management applications and agents of managed resources. The result is that the management applications need not be concerned with management protocol dependencies of the managed resources since the applications only interact with the software model representations in the MIS.

In particular, the management applications direct management tasks in the MIS via a "Portable Management Interface (PMI)" which is a high-level abstraction of an interface for manipulating objects, regardless of their class description, supported protocol, or location. The PMI is also used by the MIS to communicate with the management agents. For example, the MIS can use a management protocol adapter (MPA) to communicate with a management agent. An MPA translates MIS requests to protocol-specific primitives (e.g. CMIP, SNMP, RPC, or other proprietary/legacy protocol primitives) depending upon the management agent in question. For example, a CMIP MPA communicates with CMIP agents.

One of the most important tasks that a network manager can perform is "alarm" monitoring and management. An alarm is an unsolicited notification called a "trap" in SNMP terminology and an "event" in CMIP terminology which is generated by an agent and sent to the MIS. The notification generally indicates that a particular managed resource associated with the agent has experienced a fault or failure condition or otherwise requires attention. Alarms have an associated severity level which can range from "critical" to "warning." Network management personnel can manage the alarms by changing their state. For example, a newly generated alarm has an "open" state. Network management personnel can "acknowledge" the alarm indicating that the alarm has been noted. After investigating the problem, the alarm can be "cleared", indicating the problem has been corrected.

Alarm Services is a module in the Solstice EM™ MIS responsible for updating and storing the state of managed objects in the MIS. Alarms arrive at the MIS as event notifications (via an MPA, for example). When such an event is received by the MIS, it is stored in an alarm log as an alarm log record by a Logging Services module and the Alarm Services module is informed about the arrival of this alarm. The Alarm Services module maps each managed-object-based alarm to a corresponding node in a topology database (discussed below) and updates the alarm counters for that topology node based on the alarm severity. The Alarm Services module also keeps the severity synchronized so that it represents the highest (most critical) uncleared alarm log record that is posted against the topology node. The node status is propagated to applications like the Solstice EM™ Viewer and displayed in the appropriate color. The alarm information is also sent to the Solstice EM™ Alarm Manager application for display.

The Solstice EM™ system provides logging services, whereby all network events of interest can be logged in the system. Event logs (also referred to as "logs") maintain a record of the information provided in event notifications. Each log can be configured to select the event notification information that should be recorded in the log. An MIS can contain multiple logs, each containing a different configuration in order to record different types of information (corresponding to different events) in separate logs. Each log is a local managed object. A log contains event log records which mirror information in the event notifications. If a new notification is added to the MIS, a new event log record managed object class that corresponds to the new notification type is also added.

The Solstice EM™ system also maintains a topology database which represents the managed objects. Topology nodes are an important part of the topology database and are created by users to logically model managed objects. Each topology node has pointer(s) to the managed object(s) it represents. These managed objects can be SNMP managed objects, RPC managed resources running proprietary/legacy management protocol agents, or any object. A topology node can also represent multiple managed objects. Topology Services is a module in the MIS that provides topology database functions that can be accessed via the PMI.

While distributed client server network management systems operate well, they have some drawbacks. For example, the client portion of such systems was generally platform dependent. Therefore different client versions were necessary to allow the management operations to be performed from different locations. Further, much of the information, such as events, were forwarded back to the client application and cached in the client application for later review. Therefore, the computer system running the client application had to have significant memory and computing power. Consequently, it was often not possible for network personnel to monitor or manage a network from a convenient location, such as their home.

SUMMARY OF THE INVENTION

The aforementioned drawbacks are addressed in one illustrative embodiment of the invention in which the client portion of a distributed client-server network management system uses an interface designed with, and written in, a platform independent language, such as Java. This allows management application programs to be written in the platform independent language and insures their portability.

Further, in accordance with another aspect of the invention, the inventive interface allows a user to query the alarm log while the alarm log record information is cached at the server so that only a small client program is necessary. This program can run on a system with minimal resources, thereby allowing a network manager to manage a network from virtually any location on the network. For example, the client management application could be written as a Java applet which could then be run on any Java-enabled browser.

In accordance with still another aspect of the invention, an alarm log can be queried on any user-defined attribute based on relational criteria such as: "greater than", "less than", "equal", "not equal", etc.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
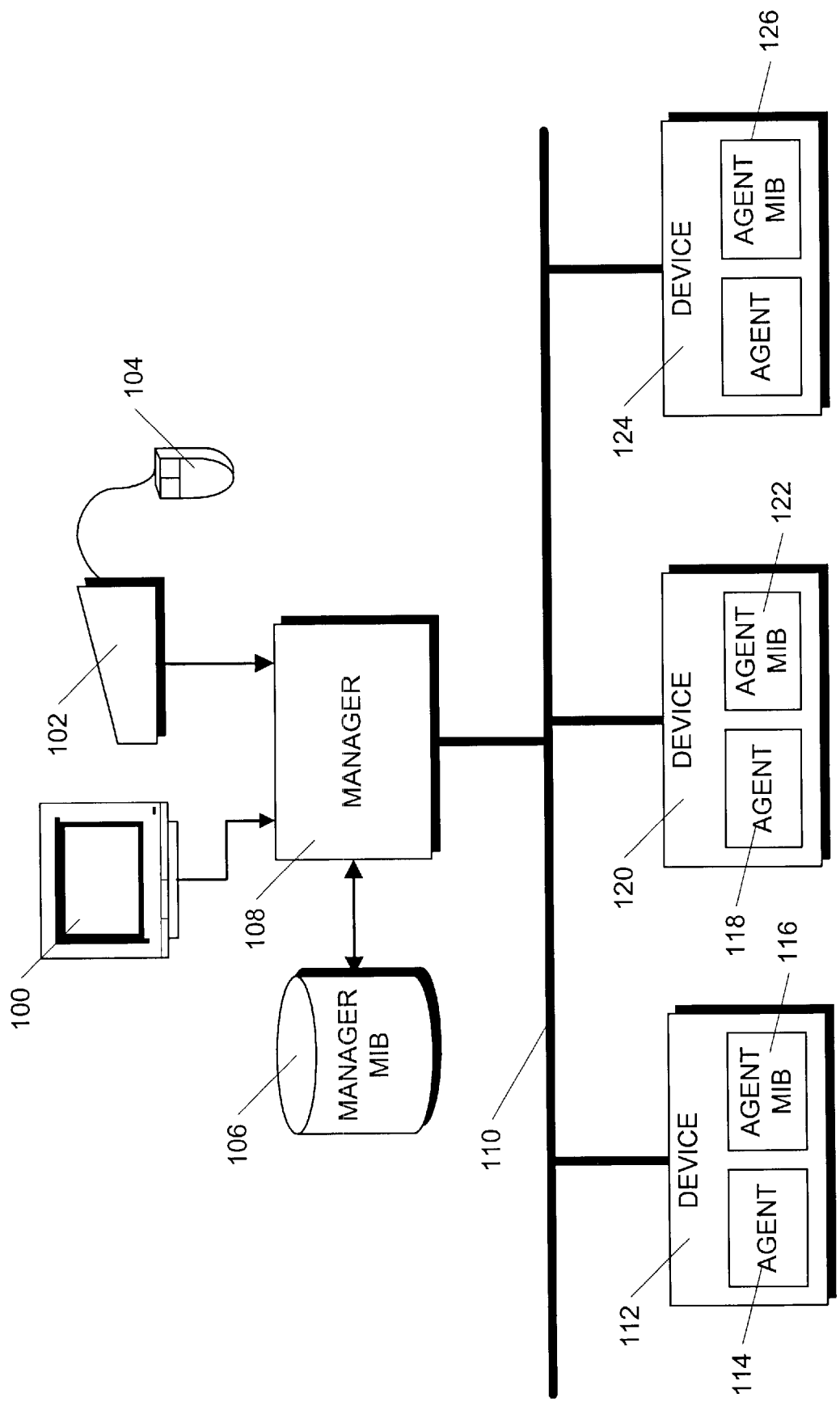
FIG. 1 is a block schematic diagram of a distributed network management system on which the present invention can be operated.

FIG. 1 is a block diagram of a distributed network management system on which an illustrative inventive network management system constructed according to the present invention can run. As shown, the system is a distributed computing environment comprising a plurality of individual computer nodes 108, 112, 120 and 124. The nodes are functionally organized into device nodes 112, 120 and 124 and at least one manager node 108 interconnected over a network 110. However, the device nodes 112, 120 and 124 and manager 108 can also be implemented on a single computer system. The manager node 108, is a conventionally programmed digital computer which includes user interfacing devices, such as a monitor 100, keyboard 102 and mouse 104. In the described embodiment, each node 108 is a network connectable computer, such as a Sun SparcStation™5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash. The manager node 108 also includes a database 106, such as a relational database, file system or other organized data storage system which stores management information in a management information database or MIB.

The Java programming language is rapidly emerging as the preferred object-oriented programming (OOP) language for cross platform use because Java programs consist of bytecodes, which are architecture and operating system independent and can be sent over the Internet and other networks. The bytecode is actually executed on a particular platform by means of a "virtual machine" (VM) which allows a Java program to be run on any platform, regardless of whether the Java program was developed on, or for, the particular platform which attempts to run the Java program. Java bytecodes which arrive at the executing machine are interpreted and executed by the embedded VM. A complete Java program is known as an application, while a segment of Java code, which does not amount to a full application, but is reusable, is referred to as an "applet".

Since Java is well-suited to operation on various platforms, the following description of the illustrative embodiment is directed toward the Java programming language. However, it will be obvious to those skilled in the art that the invention could be implemented for other OOP languages as well, e.g. C++.

Each device node, 112, 120 and 124, corresponds to a managed device which might for example, be a processor, printer, storage device, network adapter card or other network apparatus. The state of each managed device is monitored and controlled by an agent program running in the node. For example, agent programs 114, 118 and 128 run in nodes 112, 120 and 124, respectively. Each agent may also have a local management information database (116, 122 and 126, respectively) which stores status information and parameters for the managed device.

In operation, a management application program running in the manager node 108 cooperates with the agents 114,118 and 128 to manage the network. The manager 108 can download information from the agents 114,118 and 128 or from their associated databases 116, 122 and 126. The manager node 108 can also set parameters in the devices by instructing the agent programs to set parameters and values within the devices or their drivers.

Figure 2:
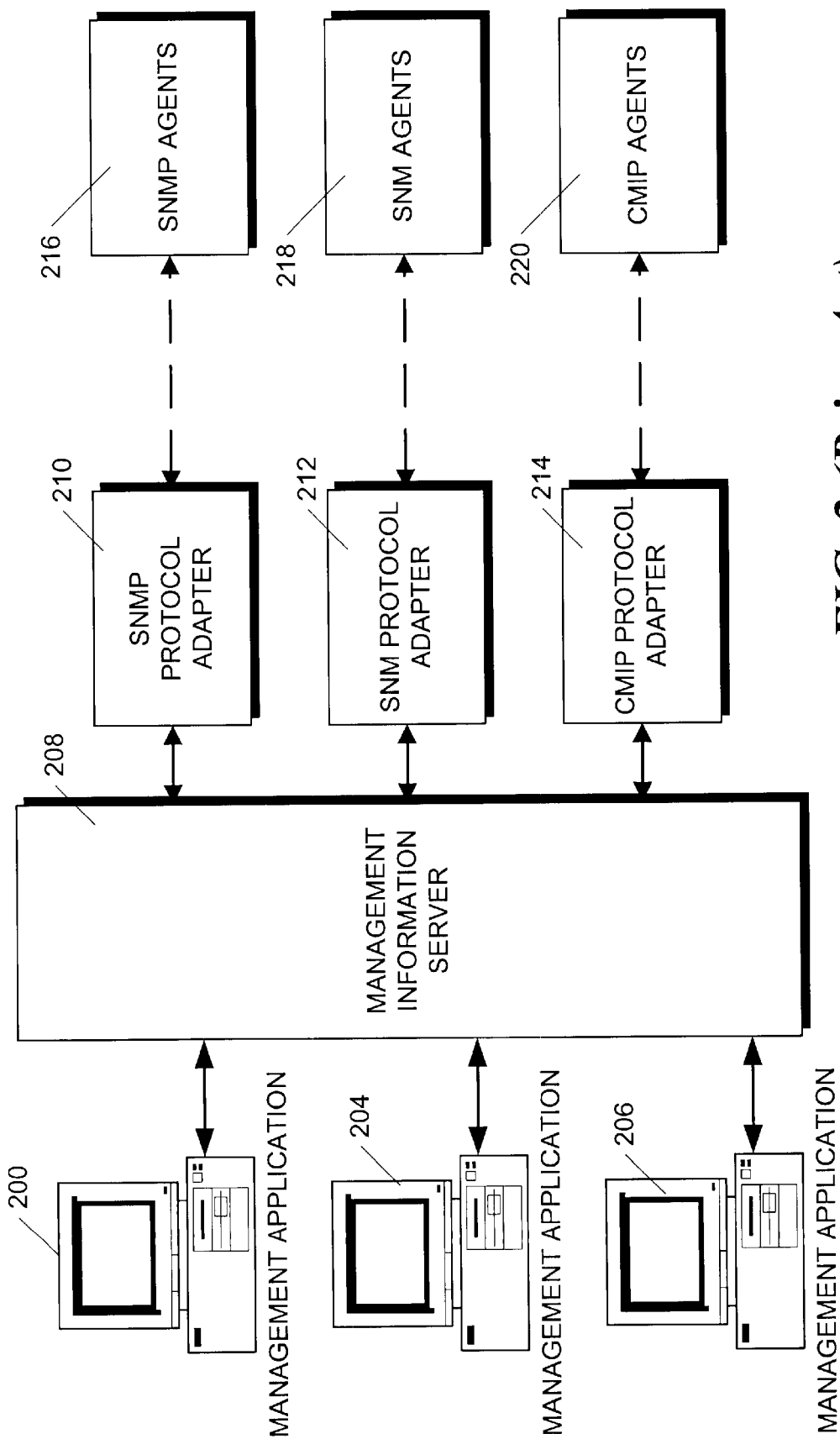
FIG. 2 is a block schematic diagram of a Solstice EM™ distributed network management system on which the present invention can be operated.

In the distributed network management system illustrated in FIG. 1, a single management node 108 is illustrated. This type of system is satisfactory for small networks. However, it does not scale easily because it is difficult to add additional management nodes as the network grows larger. FIG. 2 illustrates a distributed network management system which is designed to be scaleable by using a centralized management information server (MIS) 208. Management information server 208 can provide management information to a number of management applications operating in separate computers 200, 204 and 206, respectively. Alternatively, the management application may operate in one or more computer systems. A system based on this architecture is the Solstice Enterprise Manager™ network management system which is available from Sun Microsystems, Inc., 901 San Antonio Road, Palo Alto, Calif. The remainder of the application will be described in the context of the Solstice EM™ system. However, it will be obvious to those skilled in the art that similar network management systems could be used with the inventive management system without departing from the spirit and scope of the invention. In this system, the management applications are able to access management information located in the management information database that is now sited in the management information server 208.

The management information server 208 interacts with the agents associated with the managed objects 216, 218 and 220, respectively. These agents are typically located remotely in the device nodes and can communicate with the management information server 208 by means of a variety of protocols. In particular, management information server 208 can operate with separate protocols by means of management protocol adapters 210, 212 and 214. For example, management information server 208 can communicate with SNMP agents 216 by means of an SNMP protocol adapter 210. Similarly, management information server 208 can communicate with SunNet manager (SNM) agents 218 by means of an SNM protocol adapter 212. In a like manner, management information server 208 can communicate with CMIP agents 220 by means of a CMIP protocol adapter 214.

The configuration illustrated in FIG. 2 allows separate management applications, such as applications 200, 204 and 206, to share information and operate with a remote database located in the management information server 208. Management information server 208 can, in turn, communicate with a number of local or remote agents 216, 218, and 220 over various network facilities including the internet by means of several different protocols.

Figure 3:
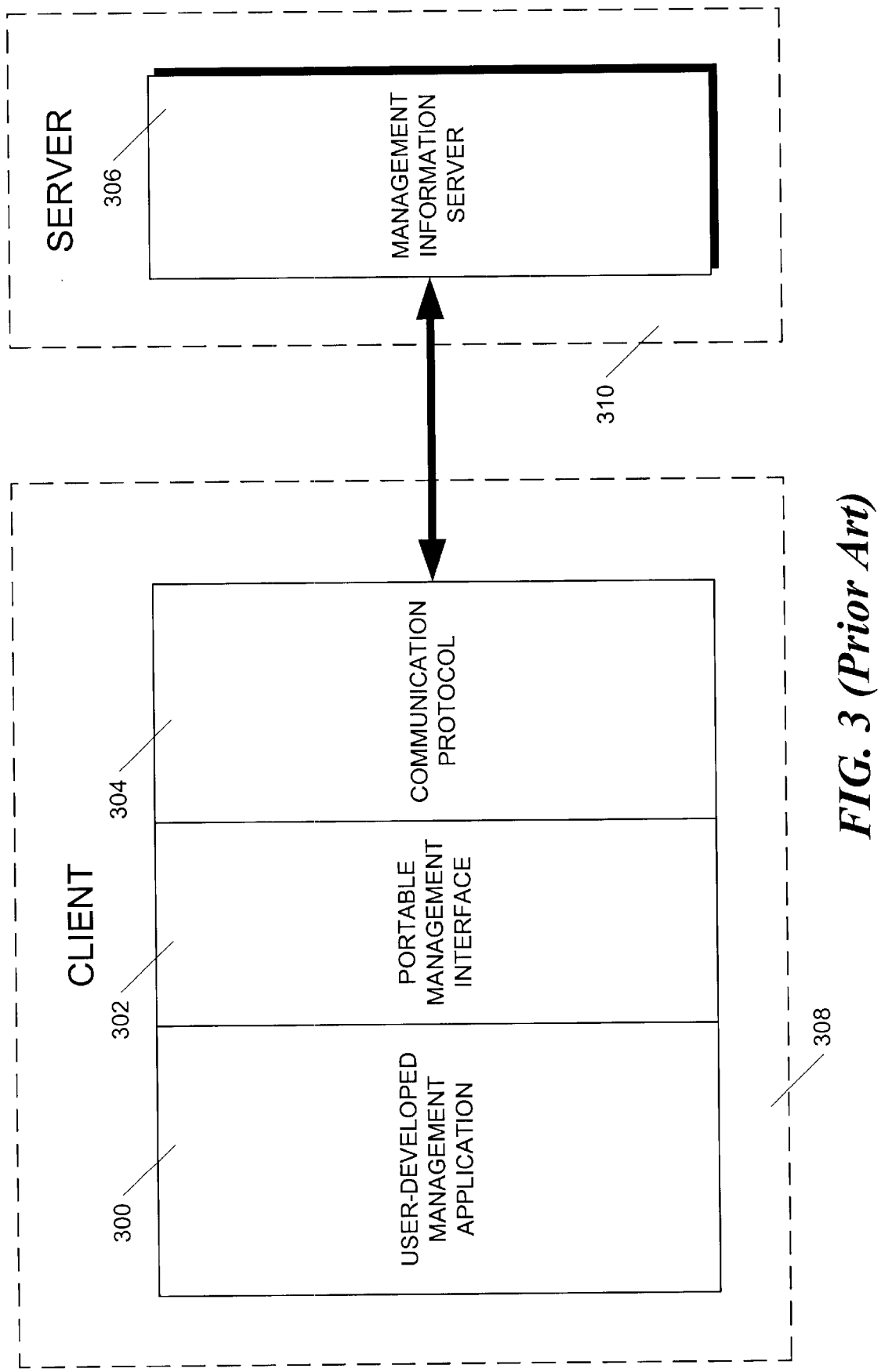
FIG. 3 is a block schematic diagram illustrating the communication between the user-developed management application and the MIS of the Solstice EM™ distributed network management system.

FIG. 3 illustrates, in a more detailed fashion, the manner in which user-developed management application 300 communicates with the MIS server 306. In particular, the user-developed management application 300 which is located in the client node 308 communicates with the management information server 306 located in the server node 310 by means of a portable management interface (PMI) 302. The portable management interface is an object-oriented interface which provides a consistent object-oriented access to the management information. It supports distributed applications that use various management protocols and address transparency. It utilizes a small number of C++ classes and allows for both asynchronous and synchronous applications, event registration for an application and various development services, such as runtime type checking.

The portable management interface 302 connects to the management information server 306 by means of a communication protocol indicated schematically as box 304. This protocol allows the portable management interface to access managed object instance state information stored or managed by the information server 306. It also allows access to managed object class schema stored by the management information server 306 and access to the event services provided by the management information server. The portable management interface 302 also allows managed object instance data to be cached in an application process and provides a simplified syntax for managed objects instance naming.

Events are handled in this system by a callback function registration procedure in which a user-developed management application which desires to obtain notification of an event which occurs in one of the devices, registers with the management information server 306 (by means of the portable management interface 302) an interest in the particular event. The application then acts as a "listener" for the event. When the event occurs, the management information server 306 calls all of the interested listeners. An object in the portable management interface 302 then handles the event call by forwarding it to the user-developed management application 300.

Figure 4:
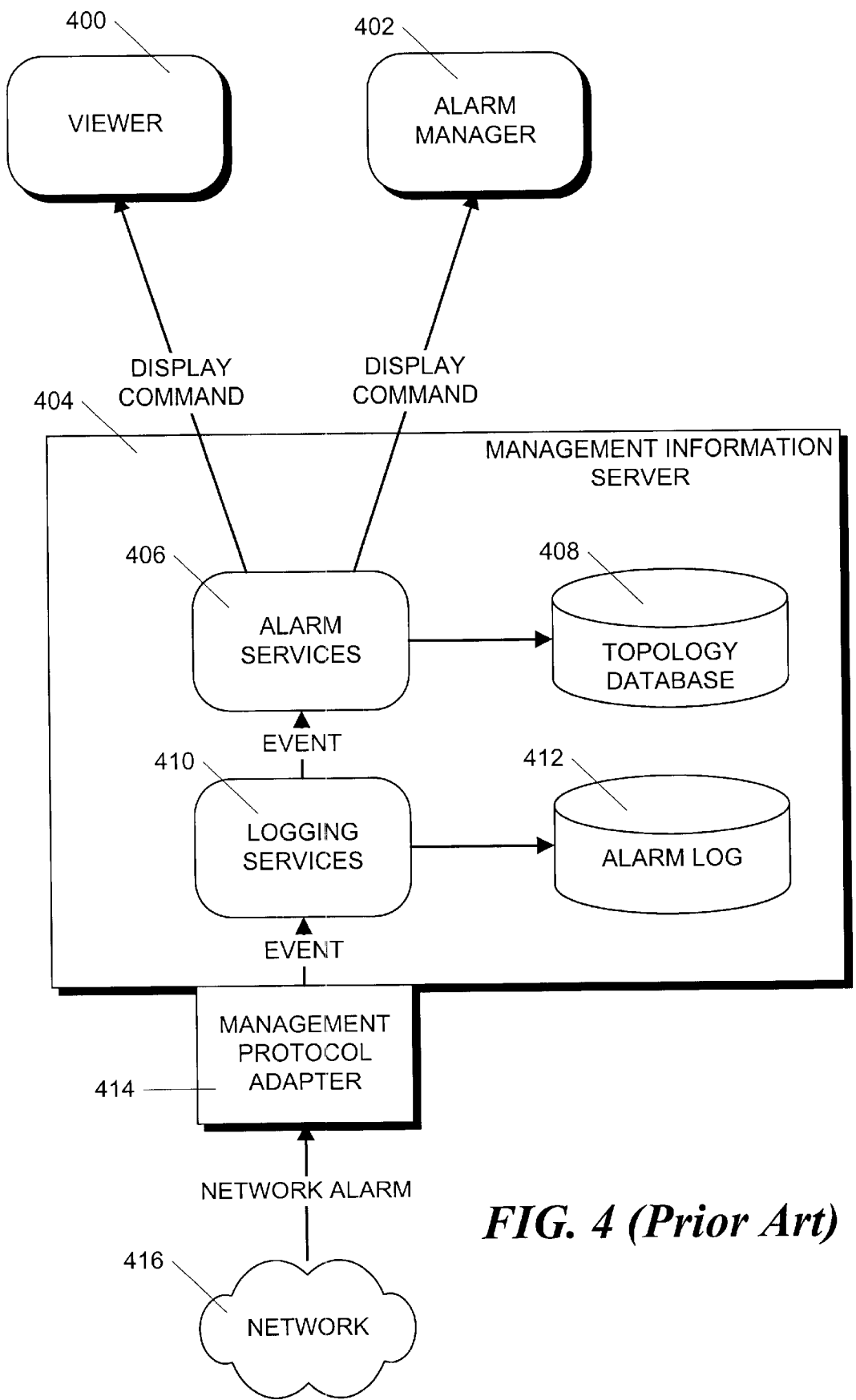
FIG. 4 is a block schematic diagram illustrating alarm services operation in the Solstice EM™ distributed network management system.

FIG. 4 illustrates, in a schematic form, the processing of network alarms by a conventional Solstice EM™ network management system. In particular, agents connected to network 416 generate events or traps (generically referred to as "network alarms") in response to conditions which occur in the resources with which they are associated. The network alarms arrive at a management protocol adapter 414 which processes the alarms and generates events that are provided to a logging services module 410. The logging services module 410 updates an alarm log database 412 by adding a record containing the alarm information. In particular, the alarm log database 412 contains alarm log records as shown in FIG. 5.

Figure 5:
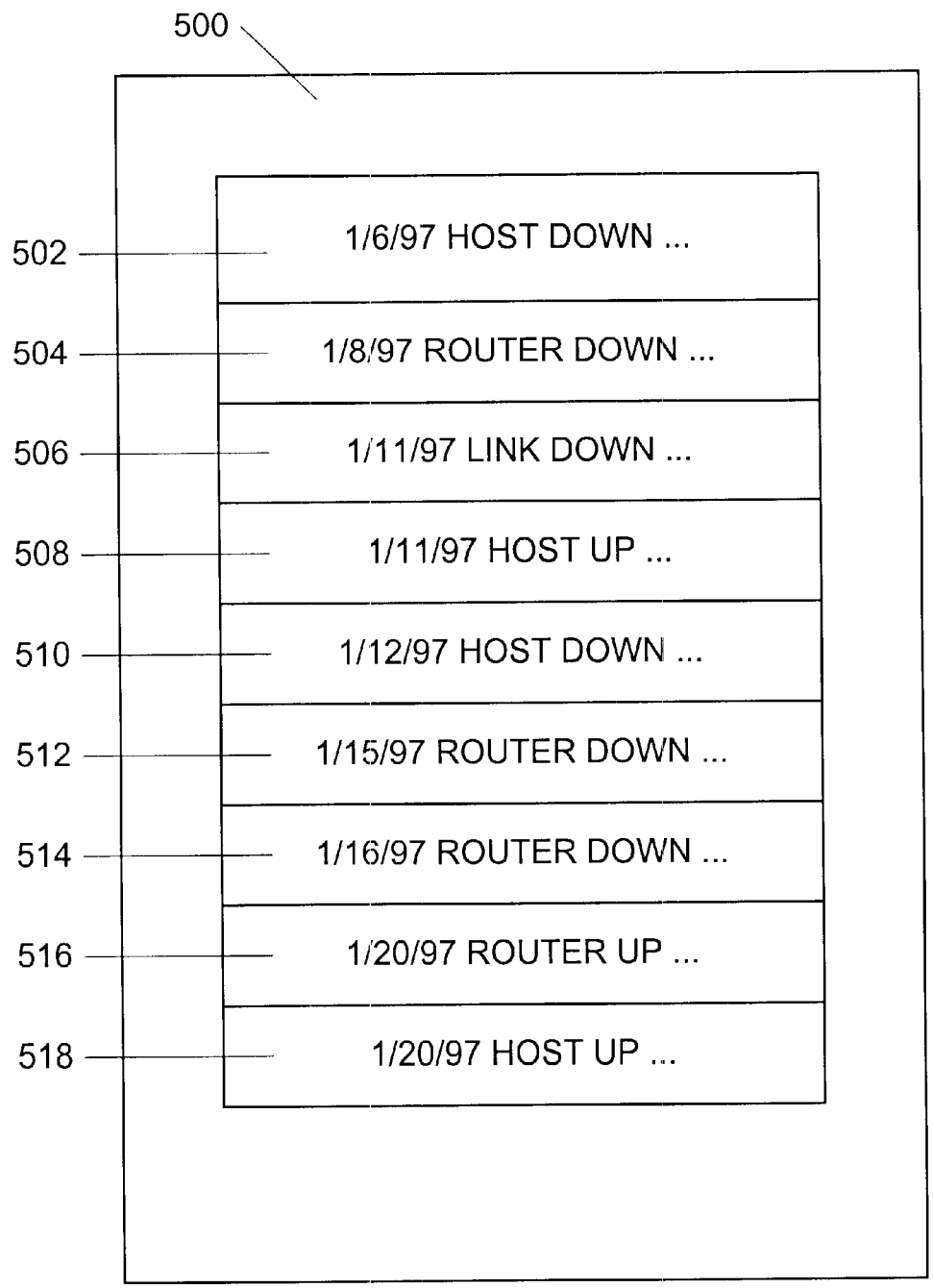
FIG. 5 is a block schematic illustration of the contents of a conventional alarm log database.

FIG. 5 illustrates a portion of alarm log database 500 which contains various alarm records, 502–518. Generally, alarm records 502–518 include information concerning the date (and time) of an alarm, its severity, its status and the alarm source and may additionally include other information helpful to network management personnel in identifying the cause of the alarm and its solution.

In addition, logging services module 410 forwards the events to an alarm services module 406. The alarm services module 406 is responsible for updating the state of a corresponding node in the topology database 408. The alarm services module 406 also generates display commands which are provided to a viewer 400 and an alarm manager 402. For example, alarm services module 406, in response to an incoming alarm event, can issue a display command to the viewer 400 causing the viewer to modify the display icon associated with the resource. In response thereto, the viewer 400 can change the color or shape of the icon. In addition, the alarm services module 406 can send another display command to the alarm manager 402 causing it to add another line on its display representing the newly-received alarm event.

In the conventional Solstice EM™ network management system, the viewer 400 and the alarm manager 402 are programs which would be located at the client terminal and manipulated by means of the portable management interface.

Figure 6:
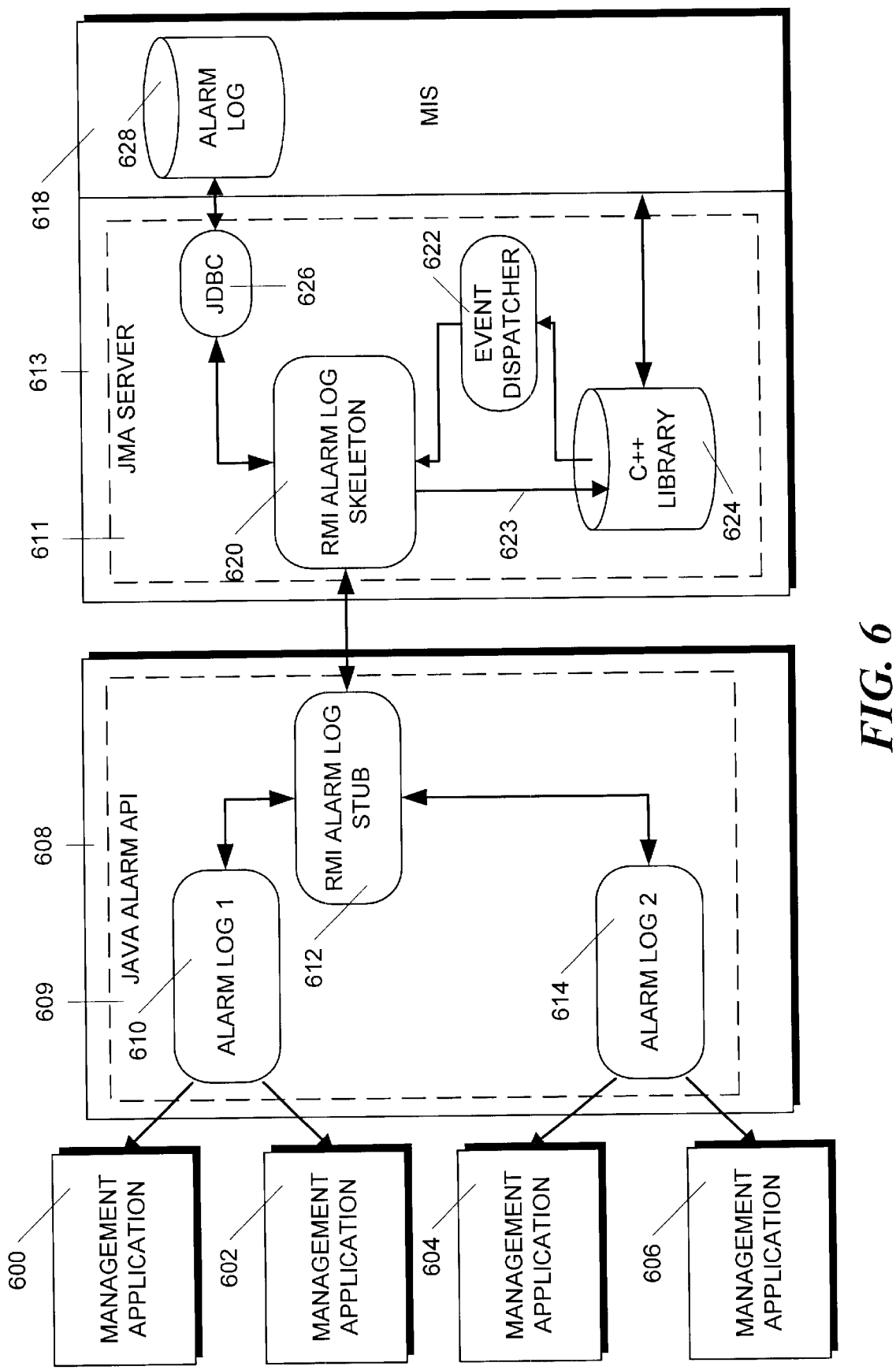
FIG. 6 is a block schematic diagram of a Java implemented distributed alarm services system built with the Solstice EM™ distributed network management system in accordance with the principles of the present invention.

The inventive system is illustrated in FIG. 6. In this system, management applications 600–606 which might, for example, be written in the Java language, communicate with the Solstice EM™ network management system MIS 618 by means of a platform-independent interface called a Java Alarm API 609 that operates in a client node 608. The Java Alarm API 609, in turn, communicates with an alarm services server called a JMA server 611 that operates in a server node 613 by means of a conventional RMI object transport system. The server 611 connects to the MIS 618 to listen for events and forwards the interested ones to the client. The server 611 also connects to the alarm log database 628 to handle queries for alarms.

More particularly, management applications, such as management applications 600 and 602, communicate with the client node 608 by means of a platform-independent JAVA API 609 which includes a remote alarm log object 610. There may be several remote alarm log objects associated with each client. For example, as shown in FIG. 6, management applications 604 and 606 communicate with a second remote alarm log object 614. In the inventive alarm services system, a client is characterized with a Platform object. The inventive alarm service consists of the Java Alarm API exposed to the client, the corresponding RMI implementation and a C++ implementation 624 on the server side which acts as an adapter. A client accesses alarms contained in a log by instantiation of a single AlarmLog class; consequently, there may be multiple AlarmLog classes per client (one for each different log).

No matter how many remote alarm log objects are created in the client node 608, only a single alarm log RMI stub 612 is created which the alarm log objects use to communicate with the JMA server 611. On the server side, for each client platform, the JMA spawns off a new server 611. This server uses the JMAEventDispatcher object 622 to send events to the client. There is one JMA server per client Platform object and the JMA server does not provide caching. This allows the implementation to scale without increasing the size of the JMA. Therefore, every time a client launches a query, the database is being accessed to get the records. This access is performed using Java via a conventional JDBC database interface 626.

The RMI alarm log stub 612 communicates with a corresponding RMI alarm log skeleton 620. The RMI alarm log skeleton 620 operates with a plurality of objects in a C++ library 624. These latter objects allow the C++ library 624 to receive events from the MIS 618 and forward the events to the RMI alarm log skeleton 620 via the JMAEventDispatcher 622. The RMI alarm log skeleton 620 can communicate with the C++ library 624, as indicated schematically by arrow 623, in order to send events to the MIS 618. The JDBC interface 626 also communicates with the RMI alarm log skeleton 620.

Thus, for example, management application 600 can make a request for alarm log records, via alarm log object 610. Alarm log object 610 then forwards the request, via RMI alarm log stub 612, to RMI alarm log skeleton 620 which, in turn reads the alarm log database 628, via the JDBC interface 626, and return the records via alarm log skeleton 620 and alarm log stub 612 to alarm log object 610. From there the records are returned to management application 600.

Similarly, events generated by the MIS 618 are received by objects in the C++ library 624. From the C++ library 624, the events are forwarded, via the JMAEventDispatcher 622 to alarm log skeleton 620 and RMI alarm log stub 612, to an event listener instantiated by the alarm log objects, 610 or 614.

Figure 7:
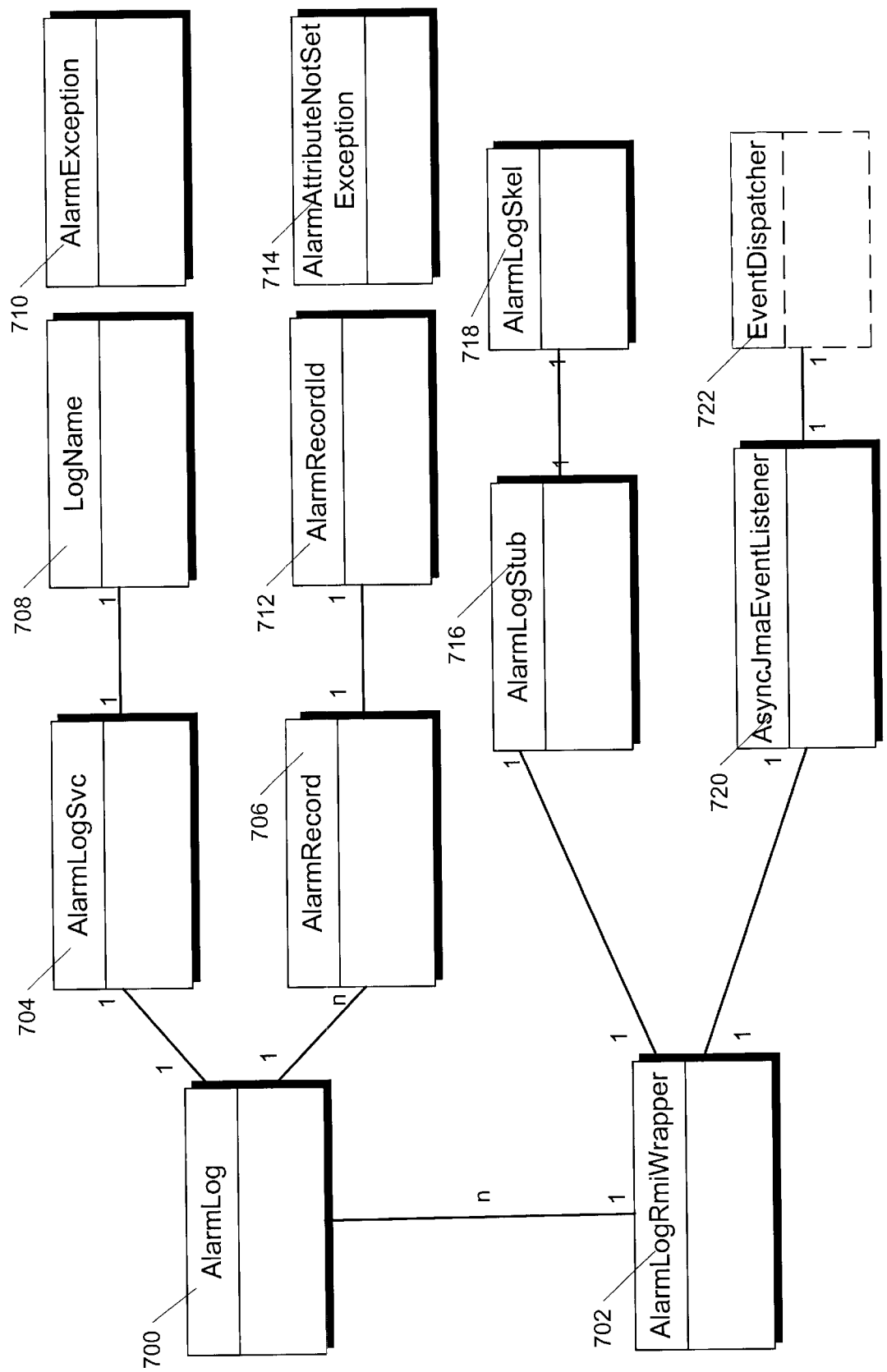
FIG. 7 is a class diagram illustrating classes in the inventive Java alarm services application programming interface.

FIG. 7 illustrates the classes involved in the inventive alarm services API and their relationships (one-to-one or one-to-many, etc.) This API gives the user the ability to query alarms under a given log, to clear, acknowledge and set attributes of a given alarm, to query alarms in batches (i.e. return alarm records asynchronously), to delete alarms and to register for alarm creation, modification and deletion events. In addition, a generic query mechanism allows the user to query on any attribute defined in an AlarmRecord class based on relational criteria such as: greater_than, less_than, equal, not_equal, greater_than_or_equal and less_than_or_equal. As an example, the following query is possible: AllAlarms for which (((perceivedSeverity is (critical or minor)) or (clearState is cleared)) and (loggingTIme after May 1, 1998)).

The AlarmLog class 700 exposes the alarms servicing API to the user and hides the use of the RMI object transport system from the user. Its contents are as follows:
private AlarmLogSvc alarmLog;
public AlarmLog(Plafform plat, LogName logName)
protected void finalize( )
public LogName getLogName( );
public void setEventAttrSet(AlarmRecordAttributeSet attrOrder)
public int getAlarmsInBatches(Query query, int batchSize, AlarmsBatchListener 1, AlarmRecordAttributeSet attrSet)
public void stopGetAlarmsinBatches(int callid)
public alarmRecord[] getAlarms(Query query, AlarmRecordAttributeSet aftrSet)
public int getAlarmCount(Query query)
public int[] getAlarmCountBySeverity(MOName[] moName, EMSeverity] sev)
public void setClearAlarms(AlarmRecord[] ids, String[] clearText)
public void setDisplayAlarms(AlarmRecord[] ids, String[] displayText)
public void setAckAlarms(AlarmRecord[] ids, String[] ackText)
public void setUnAckAlarms(AlarmRecordId[] ids)
public void setUndisplayAlarms(AlarmRecordId[] ids)
public void setUnClearAlarms(AlarmRecordId[] ids)
public void sendClearAlarmsEvent(AlarmRecordId[] ids)
public void deleteAlarms(AlarmRecordId[] ids)
public void addAlarmLogCreationListener (AlarmLogCreationListener I)
public void removeAlarmLogCreationListener (AlarmLogCreationListener I)
public void addAlarmLogDeletionListener (AlarmLogDeletionListener I)

public void removeAlarmLogDeletionListener
  (AlarmLogDeletionListener I)
public void addAlarmLogModificationListener
  (AlarmLogModificationListener I)
public void removeAlarmLogModificationListener
  (AlarmLogModificationListener I)
public void addAlarmLogListener(AlarmLogListener I)
public void removealarmLogListener(AlarmLogListener I)

The parameters for the constructors are the Plafform and the LogName classes. A LogName class instance contains the Log name and the MIS name for which the user want to query alarms on. The AlarmLog class contains a pointer to an AlarmLogSvc class instance described below which contains some platform dependent contents. The setter and getter methods are self-explanatory. The remaining major methods are discussed below:

finalize ( ): this method is being called before the object destructor is called in order to perform "housekeeping" duties.

setEventAttrSet( ): this method specifies which attributes need to be returned in an event. The method can be invoked at any time and will be applicable to all new incoming events.

getAlarmsInBatches( ): this method is invoked to retrieve alarm records asynchronously. The batchsize parameter specifies the number of alarm records contained in each response. The batch transfer can be stopped at any given time by specifying the batchId returned by this function setClearAlarms( ): this method is invoked to set the clearState and the clearText of a list of AlarmRecords.

sendClearAlarmsEvent ( ): this method is invoked to clear all alarms with the same perceivedSeverity, same Managed Object Instance and same eventType as the alarmRecordId specified.

AddAlarmLogCreationListener( ): this method is invoked to register for AlarmRecord creation.

addAlarmLogListener( ): this method is invoked to register for AlarmRecord creation/deletion and modification.

The AlarmLogSvc class 704 has similar contents to the AlarmLog class 700, but contains some members specific to the implementation. For example, since there can be many instances of AlarmLogSvc but only one instance of the RMI stub and skeleton classes (AlarmLogStub 716 and AlarmLogSkel 718) per platform, the AlarmLogSvc class 704 contains a static hash table (Platform→AlarmLogRmiWrapper 702). The contents of the AlarmLogSvc class 704 are as follows:
private AlarmLogRmi logRmi=null;
private static Hashtable rmiTable=new Hashtable( );
AlarmLogRmiWrapper alarmWrapper=null;
Vector alarmLogListener=new Vector();
Vector alarmLogCreationListener=new Vector();
Vector alarmLogDeletionListener=new Vector();
Vector alarmLogModificationListener=new Vector();
AlarmRecordAttributeSet eventAttrSet=null;
LogName logName;
public AlarmLogSvc(platform plat, LogName logName)
public void dispose( )
protected void finalize( )
public void setEventAttrSet(AlarmRecordAttributeSet attrOrder)
public int getAlarmsInBatches(Query query, int batchSize, AlarmsBatchListener I,
AlarmRecordAttributeSet attrSet)
public void stopGetAlarmsInBatches(int callid)
public AlarmRecord[] getAlarms(Query query, AlarmRecordAttributeSet attrSet)
public int getAlarmCount(Query query)
public int[] getAlarmCountBySeverity(MOName[] moName, EMSeverity[] sev)
public void setClearAlarms(AlarmRecordId[] ids, String[] clearText)
public void setDisplayAlarms(AlarmRecordId[] ids, String[] displayText)
public void setAckAlarms(AlarmRecordId[] ids, String[] ackText)
public void setUnAckAlarms(AlarmRecordId[] ids)
public void setUndisplayAlarms(AlarmRecordId[] ids)
public void setUnClearAlarms(AlarmRecordId[] ids)
public void sendClearAlarmsEvent(AlarmRecordId[] ids)
public void addAlarmLogCreationListener
  (AlarmLogCreationListener I)
public void removeAlarmLogCreationListener
  (AlarmLogCreationListener I)
public void addAlarmLogDeletionListener
  (AlarmLogDeletionListener I)
public void removeAlarmLogDeletionListener
  (AlarmLogDeletionListener I)
public void addAlarmLogModificationListener
  (AlarmLogModificationListener I)
public void removeAlarmLogModiflcationListener
  (AlarmLogModificationListener I)
public void addAlarmLogListener(AlarmLogListener I)
public void removeAlarmLogListener(AlarmLogListener I)
private void addAlarmsinBatchesListener
  (AlarmsBatchListener I)
private void removeAlarmsBatchListener
  (AlarmsBatchListener I)
public void alarmRecordCreated(AlarmLogEvent e)
public void alarmRecordModified(AlarmLogEvent e)
public void alarmRecordDeleted(AlarmLogEvent e)
public LogName getLogName( );
public void deleteAlarms(AlarmRecordId[] ids);
As discussed above the major mthods are:
finalize( ): this method is invoked before the destructor is called and calls the dispose( ) method.
dispose( ): the method destroys the event Listener vectors, decrements the count of instances in the AlarmLog RmiWrapper class 702, and calls AlarmLogRmiWrapper::finalize( ) if the reference count is 0;
setEventAttrSet( ): this method is invoked to specify which attributes need to be returned in an event. The method can be invoked at any time and will be applicable to all new incoming events.
getAlarmsInBatches( ): this method is invoked to get alarm records asynchronously. The batchsize specifies the number of alarm records contained in each response. Batch transfer can be stopped at any given time by specifying the batchid returned by this function.
setClearAlarms( ): this method is invoked to set the clearState and the clearText of a list of AlarmRecords.
clearAlarms( ): this method is invoked to clear all alarms with the same perceivedSeverity, same MOI and same eventType as the alarmRecordId specifed.
addAlarmLogCreationListener( ): this method is invoked to register for AlarmRecord creation.
addAlarmLogListener( ): this method is invoked to register for AlarmRecord creation/deletion and modification.
getLogName( ): this method is invoked to return the LogName.

The AlarmLogRmiWrapper class 702 is not exposed to the end-user and is mainly used for reference-counting and to ensure that there is only one AlarmLogStub/AlarmLogSkel pair per platform. An instance of the AlarmLogRmiWrapper class 702 registers for alarm events generated by the MIS with the JMA event dispatcher as soon as there one instance of the AlarmLog class 700 has been instantiated. When all instances of the AlarmLog class 700 have been destroyed, the AlarmLogRmiWrapper instance de-registers with the JMA event dispatcher. The AlarmLogRmiWrapper class 702 includes:
public AlarmLogRmi logRmi=null;
public AsyncJmaEventListener async=null;
public eventListeners=new Vector();
boolean disposed=false;
public int num_instances=0;
public AlarmLog(platform plat, String logName)
public AlarmLogRmiWrapper(AlarmLogRmi logRmi)
public void setEventAttrSet(AlarmRecordAttributeSet attrSet)
public void addAlarmListener(AlarmLogListener I, AlarmRecordAttributeSet attrSet)
public void removeAlarmListener(AlarmLogListener I)
public void processEvent(JmaEvent jmaEvent)

The methods in this class are self-explanatory.

The AlarmLogStub class 716 and the AlarmLogSkel class 718 are not visible to the end-user. These classes implement the RMI stub/skeleton for the inventive API over RMI and are conventionally generated by an RMI compiler..

The AsyncJmaEventListener class 720 is not visible to the end-user and is used to receive batch responses. It operates with the EventDispatcher class 722 located in the JMA. Its contents are as follows:
public AsyncJmaEventListener async=null;
boolean disposed=false;
public synchronized void processEvent(JmaEvent jmaEvent)
public void finalize( )
public void dispose( )

The AlarmRecord class 706 represents a single alarm record in the alarm log database. Its contents include:
private LogName logName;
private String ackoperator;
private Boolean ackState;
private String ackText;
private Date ackTime;
private String clearOperator
private Boolean clearState;
private String clearText;
private Date cleartime;
private String displayoperator;
private Boolean displayState;
private String displayText;
private Date displayTime;
private Date eventTime;
private String eventType;
private AlarmRecordId logRecordid;
private Date loggingTime;
private String managedObjectinstance;
private EMSeverity perceived Severity;
private String probableCause;
private String additionalText;
public String getAckOperator( );
public boolean getAckState( );
public String getAckText( );
public String getAdditionalText( );
public Date getAckTime( );
public String getClearOperator( );
public boolean getClearState( );
public String getClearText( );
public Date getClearTime( );
public String getDisplayoperator( );
public boolean getDisplayState( );
public String getDisplayText( );
public Date getDisplayTime( );
public Date getEventTime( );
public String getEventType( );
public AlarmRecordId getLogRecordId( );
public Date getLoggingTime( );
public String getManagedObjectinstance( );
public EMSeverity getPerceivedSeverity( );
public String getProbableCause( );
public String toString( );
private AlarmRecordAttributeSet getAttrSet( )
public LogName getLogName( )

Any method in the AlarmRecord class 706 throws an exception of type AlarmAttributeNotSetException if the corresponding attribute is not set.

The LogName class 708 holds the name of the log which contains the alarm records to query and MIS name. The MIS name can be different from the MIS to which the client is connected. It contents are:
String logName;
String MISName;
String fullLogName;
public LogName(String mis, String log);
public LogName(String mis, Integer log);
public LogName(String mis, int log);
public LogName(String fullname);
public String getMisName( );
public String getLogName( )
public String getFullLogName( );
public boolean equals(Object obj)
public String toString( );

The major methods are:
getFullLogName( ): this method is invoked to return the concatenation of the MIS name and the log name.
getLogName( ): this method is invoked to return the log name The AlarmRecordId class 712 holds the ID of the alarm log records which are addressed by a used-defined query. Its contents are:
private Boolean is_number=Boolean.TRUE;
private int displayld;
private String displayStr
public AlarmRecordId(int alarmId);
public int getDisplayid( );
public String getAlarmFullName( );
public String toString( );
public boolean equals(Object obj)
public Object clone( )

Figure 8:
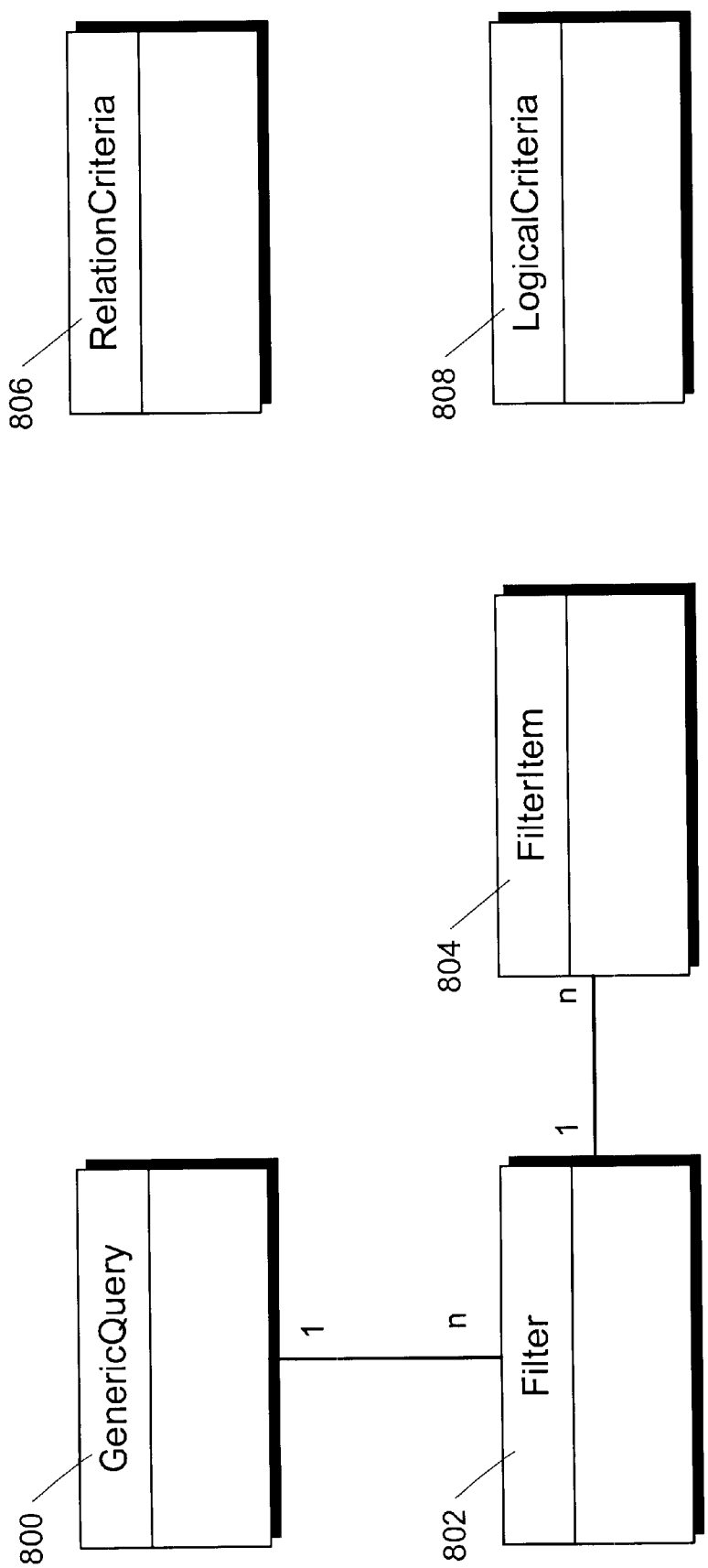
FIG. 8 is a class diagram illustrating query classes in the inventive Java alarm services application programming interface.

The AlarmException class 710 encapsulates an exception which is thrown when an error occurs in the underlying service Its contetns are:
public AlarmException(String message);
public AlarmException(Throwable t);
The AlarmAttributeNotSetException class 714 encapsulates an exception which is thrown when the user tries to access fields in an alarm record that were not previously set. Its contents are:
public AlarmAttributeNotSetException(String message);
public AlarmAttributeNotSetException(Throwable t);

FIG. 8 illustrates the classes which are involved in constructing a user-defined query to the alarm log database in order to obtain a set of alarm log records. These classes include the following:

The GenericQuery class 800 is exposed to the user and implements a generic query mechanism. It contains an AND list of Filters. Note that the Query interface used in the alarm log API classes is empty, but is implemented by the GenericQuery class 800 to avoid changes to the alarm log API if the GenericQuery class 800 has to be changed. This class includes:
private Vector filterList=new Vector( );
public boolean removeFilter( )
public void addFilter( )
public void clear( )
public Enumeration elements( )
public String toString( )

The Filter class 802 is exposed to the user and contains an OR or AND list of filter items, each of which is defined by the Filteritems class 804. The filter class contains:
LogicalCriteria logicalop=LogicalCriteria.AND;
private Vector filter=new Vector( );
public Filter(LogicalCriteria op, Filteritem filterItem)
public Filter(FilterItem filterItem)
public void setLogicalCriteria(LogicalCriteria op)
public LogicalCriteria getLogicalCriteria( )
public void addFilterItem(FilterItem filterItem)
public boolean removeFilterFilterItem(FilterItem filterItem)
public void clear( )
public Enumeration elements( )
public String toString( )

The Filteritem class 804 is exposed to the user. It contains an attributeName, the relationCriteria to be matched (EQUAL, NOT_EQUAL, GREATER_THAN, GREATER_THAN_OR_EQUAL, LESS_THAN, LESS_THAN_OR_EQUAL) and the value. For example: perceivedSeveriy EQUAL (critical). The contents are as follows:
private AlarmRecordAttribute attrName;
private RelationCriteria relation;
private Object[] attrValue;
public FilterItem(AlarmRecordAttribute name, RelationCriteria rel, EMSeverity[] value)
public FilterItem(AlarmRecordAttribute name, RelationCriteria rel, String[] value)
public FilterItem(AlarmRecordAttribute name, RelationCriteria rel, Boolean value)
public FilterItem(AlarmRecordAttribute name, RelationCriteria rel, Date value)
public FilterItem(AlarmRecordAttribute name, RelationCriteria rel, MOName[] value)
public FilterItem(AlarmRecordAttribute name, RelationCriteria rel, AlarmRecordId[] value)
public RelationCriteria getRelationCriteria( )
public AlarmRecordAttribute getAttrName( )
public Object[] getAttrValue( )
public String toString( )
EMSeverity[] sev={EMSeverity.CRITICAL, EMSeverity.MINOR};
FilterItem filterItem=new FilterItem (AlarmRecordAftribute.PERCEIVED_SEVERITY, RelationCriteria.EQUAL, sev);
FilterItem filterItem1=new FilterItem (AlarmRecordAttribute.ACK_STATE, RelationCriteria.EQUAL, Boolean.TRUE);
MOName moName=new MOName(0, "/systemId=name:\"booggy\"/agentTableType=\"RPC\"/agentld=id:\"booggy\");
MOName value={moName};
FilterItem filterItem2=new FilterItem\050AlarmRecordAttribute.MANAGED_OBJECT_INSTANCE,
Relation- Criteria.EQUAL, value);
Filter filter=new Filter( );
filter.setLogicalCriteria(LogicalCriteria.OR);
filter.addFilterItem(filterItem);
filter.addFilterItem(filterItem1);
Filter filter1=new Filter( );
filter1.addFilterItem(filterItem2);
GenericQuery query=new GenericQuery( );
query.addFilter(filter);

The Filteritem(AlarmRecordAttribute name, RelationCriteria rel, EMSeverity[] value) constructor applies for PerceivedSeverity. The FilterItem(AlarmRecordAttribute name, RelationCriteria rel, String[] value) constructor applies for: EventType, additionalText, display/ack/clearOperator, display/ack/clearText. The FilterItem (AlarmRecordAttribute name, RelationCriteria rel, Boolean value) constructor applies for: clear/ack/displayState. The FilterItem(AlarmRecordAttribute name, RelationCriteria rel, Date value) constructor applies for loggingTime, clearTime, displayTime, eventTime, and ackTime. The FilterItem(AlarmRecordAttribute name, RelationCriteria rel, MOName[] value) constructor applies for Managed Object Instances (MOName) and the FilterItem (AlarmRecordAttribute name, RelationCriteria rel, AlarmRecordId[] value) constructor applies for AlarmRecordId[].

As an example the following query could be build by the client: getAlarms where ((perceivedseverity equal (minor or critical)) OR (ackState equal "acked")) AND (MOName equal "/systemld=name:\"booggy\").

Figure 9:
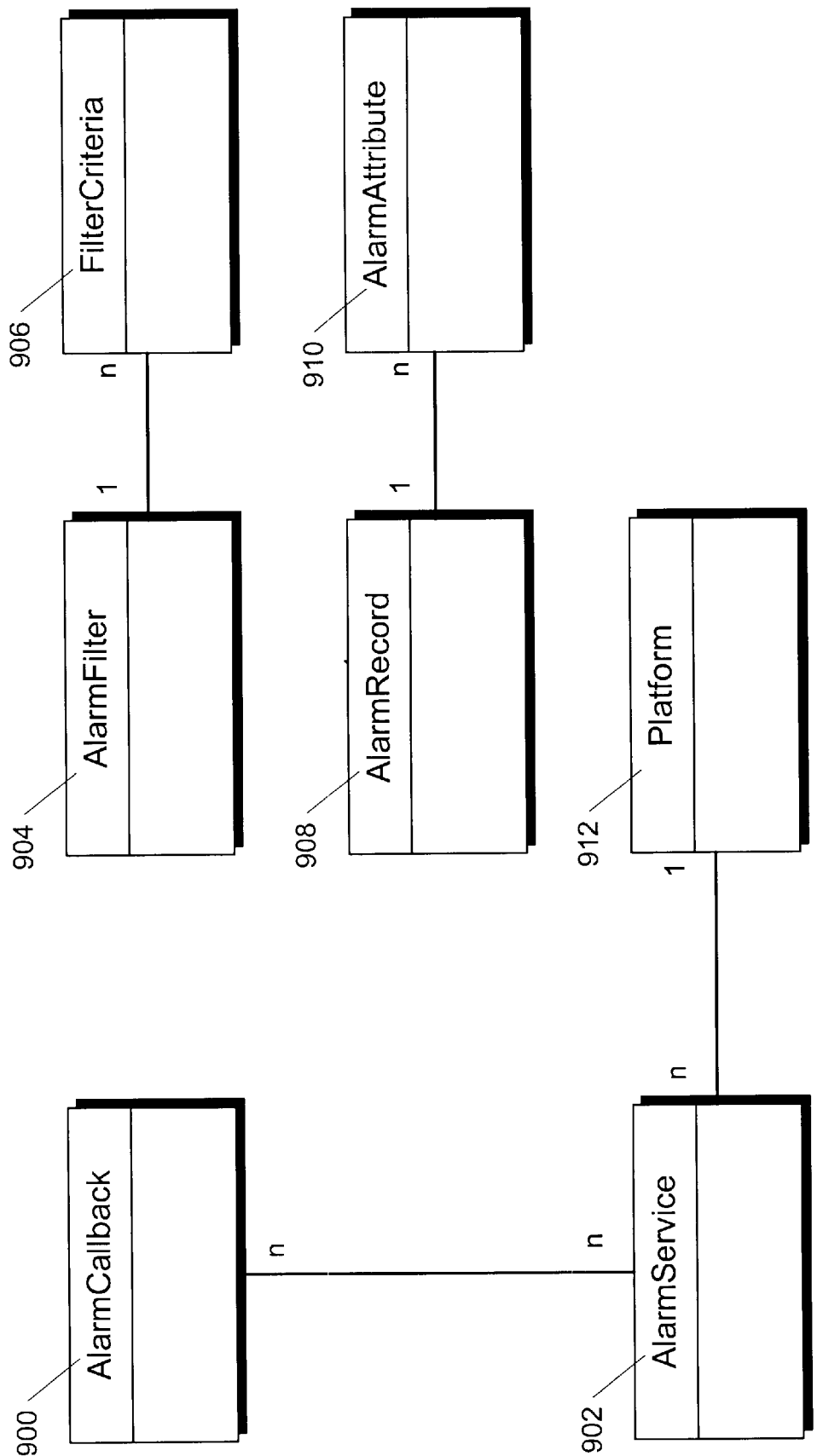
FIG. 9 is a class diagram illustrating classes in the inventive C++ library application programming interface.

The RelationCriteria class 806 encapsulates the logical relation operators and includes:
static final int BASE_IX=0;
static final int EQUAL_ID=BASE_IX;
static final int NOT_EQUAL_ID=BASE_IX+1;
static final int GREATER_THAN_ID=BASE_IX+2;
static final int GREATER_THAN_OR_EQUAL_ID= BASE_IX+3;
static final int LESS_THAN_ID=BASE_IX+4;
static final int LESS_THAN_OR_EQUAL_ID=BASE_IX+5;
static String relationNames[]={"equal", "not_equal", "greater_than",
"greater_than or equal", "less_than", "less_than_or equal"};
public static final RelationCriteria EQUAL=new RelationCriteria(EQUAL_ID);
public static final RelationCriteria NOT_EQUAL=new RelationCriteria(NOT_EQUAL_ID);
public static final RelationCriteria GREATER_THAN=new RelationCriteria(GREATER_THAN_ID);
public static final RelationCriteria GREATER_THAN_OR_EQUAL=new RelationCriteria(GREATER_THAN_OR_EQUAL_ID);
public static final RelationCriteria LESS_THAN=new RelationCriteria(LESS_THAN_ID);
public static final RelationCriteria LESS_THAN_OR_EQUAL=new
RelationCriteria(LESS_THAN_OR_EQUAL_ID);
static final int NUM RELATION=6;
RelationCriteria(int id)
public String toString( );
private int rangecheck(int id);

The LogicalCriteria class 808 encapsulates logical relationships and includes:
static String logicalNames[]={"OR", "AND"};
static final int BASE_IX=0;
static final int OR_ID=BASE_IX
static final int AND_ID=BASE_IX+1;
public static final LogicalCriteria OR=new LogicalCriteria (OR_ID);
public static final LogicalCriteria AND=new LogicalCriteria (AND_ID);
static final int NUM_LOGICAL=2;
LogicalCriteria(int id);
public String toString( )
private int rangecheck(int id);

FIG. 9 illustrates the classes which comprise the C++ Interface Library 624 (FIG. 6.) The C++ API is internal and is exposed to the user. This library is the interface for the JMA to the MIS and the database and comprises the AlarmCallback class 900, the AlarmService class 902, the Platform class 912, the AlarmFilter class 904 and its corresponding FilterCriteria class 906. Finally the API includes the AlarmRecord Class 908 and its corresponding AlarmAttribute class 910.

The AlarmService class 902 provides the interface between the JMA and the MIS. It includes:
RWCString mis;
Platform plat;
RWTValSlist<RWCString> log_list;
RWTValSlist<RWCString> available_log_list;
RWTPtrSlist<ASCallback> add log callback_list;
RWTPtrSlist<ASCallback> remove_log_callback_list;
RWTPtrSlist<ASCallback> add logrecord_callback_list;
RWTPtrSlist<ASCallback> remove_logrecord_callback_list;
RWTPtrSlist<ASCallback> change_logrecord_callback_list;
AlarmService(RWCString mis);
add_log(RWCString logname);
remove_log(RWCString logname);
RWTValSlist<RWCString> get_available_logs( );
register add_log_callback(ASCallback *cb);
register remove_log_callback(ASCallback *cb);
register add_log_record_callback(ASCallback *cb);
register remove_log_record_callback(ASCallback *cb);
register change_log_record_callback(ASCallback *cb);
RWTValSlist<AlarmRecord> load_alarm_records (RWTValSlist<AlarmFilter> filter, RWTValSlist<AlarmAttributeId> attr_list);
RWTValSlist<AlarmRecord> load_alarm_records (RWTValSlist<AlarmAttributeId> attr_list);
int get_alarm_record_count(AlarmFilter filter);
int get_alarm_record_count( );
RWCString get_misname( );
delete alarm_records(RWCString logname, RWTValSlist<RWCString> alarm_ids); clear_alarm_records(RWCString logname, RWTValSlist<RWCString> alarm_ids);

The major methods are described as follows:
add_log( ): this method is invoked to add a new log to the service. The C++ AlarmService supports multiple logs. A log name is the concatenation of the MIS name and the log name.
add_log_callback: this method is invoked to register a callback that is called when there is a new log creation.
add_log_record_callback: this method is invoked to register a callback that is called after logRecord creation.
load_alarm_record: this method is invoked to get a list of AlarmRecord based on a query.
get_alarm_record_count: this method is invoked to get the number of AlarmRecords matching the query.
get_misname: this method is invoked to return the MIS name the client is connected to
delete_alarm_records: this method is invoked to delete alarmRecords.
clear_alarm_records: this method is invoked to send a clear event
store( ): this method is the same as image.store( ) and is used to modify attributes of AlarmRecord.

The AlarmRecord class 908 encapsulates each alarm log record. It includes:
RWCString mis;
RWCString log;
RWCString rec_id;
RWTValSlist<AlarmAttribute> attributes;
RWCString get_mis_name( );
RWCStromg get_log_name( );
RWCString get_record_id( );
set_attribute(AlarmAttribute attr);
RWCString get_alarm_attribute(AlarmAttributeId attr);
Boolean store( );

Each AlarmRecord has an MIS name associated to it and a log name

The AlarmAttribute class 910 encapsulates attributes of the alarm records. This class contains:
AlarmAttributeId attribute_id;
RWCString attribute_value;
AlarmAttribute(const AlarmAttributeId& at_id, const RWCString& val);
AlarmAttribute(const AlarmAttribute& other);
RWCString get_attribute_name( );
RWCString get_attribute_value( );
static AlarmAttributeId get_attribute_id(const RWCString& attrname);
static RWCString get_attribute_name(const AlarmAttributeId& attrId);

The AlarmCallback class 900 provides a callback point for the JMA EventDispatcher to notify a client of an event. This class includes:
void( )(void*,void*)* callback_function;
void* user_data;

The AlarmFilter class 904 encapsulates filtering methods for filtering alarm records obtained in response to a user query and includes:
LogicalOpCriteria logic_operation;
RWTPtrSlist<FilterCriteria> filter_list;
void set_logical_op( LogicalOpCriteria);
void add_filter_criteria(RWCString attr name, RelationOpCriteria operation, RWTValSlist<RWCString> & attr_values);
void delete_filter_criteria(RWCString attr_name);
FilterCriteria *get_filter_criteria(RWCString attr_name);

The FilterCriteria class 906 encapsulates criteria used in the AlarmFilter class 904 and includes:
RWCStringattr_name;
RWTValSlist<RWCString> attr_values;
RelationOpCriteria relation;
const RWCString& get_attrib_name( );
int get_number_of_values( );
const RWTValSlist<RWCString> & get_attrib_values( );
FilterCriteria(RWCString attrib_name, RelationOpCriteria operation, RWTValSlist<RWCString> & attrib_values);

```
enum RelationOpCriteria {
  //Filter criteria relations.
  NO_REL, //Used only for initialization.
  EQUAL,
  NOT_EQUAL,
  GREATER_THAN,
  GREATER_THAN_OR_EQUAL,
  LESS_THAN,
  LESS_THAN_OR_EQUAL
};
enum LogicalOpCriteria {
NO_LOG, //used only for initialization.
OR,
AND
enum AlarmAttributeId {
  NONE,
  accessControlInfo,
  ackoperator,
  ackState,
  ackText,
  ackTime,
  additionalInformation,
  additionalText,
  attributeIdentifierList,
  backUpObject,
  backedUpStatus,
  clearOperator,
  clearState,
  clearText,
  clearTime,
  correlated Notifications,
  displayOperator,
  displayState,
  displayText,
  displayTime,
  eventTime,
  eventType,
  internetTrapInfo,
  loggingTime,
  logRecordId,
  managedObjectClass,
  managedObjectInstance,
  monitoredAttributes,
  mosiSeverity,
  mosiStateID,
  notificationId,
  objectInstanceList,
  perceived Severity,
  probableCause,
  proposed RepairActions,
  snmpVarBindList,
  specificProblems,
  stateChangeDefinition,
  thresholdInfo,
  transportDomain,
  trendIndication
```

Figure 10:
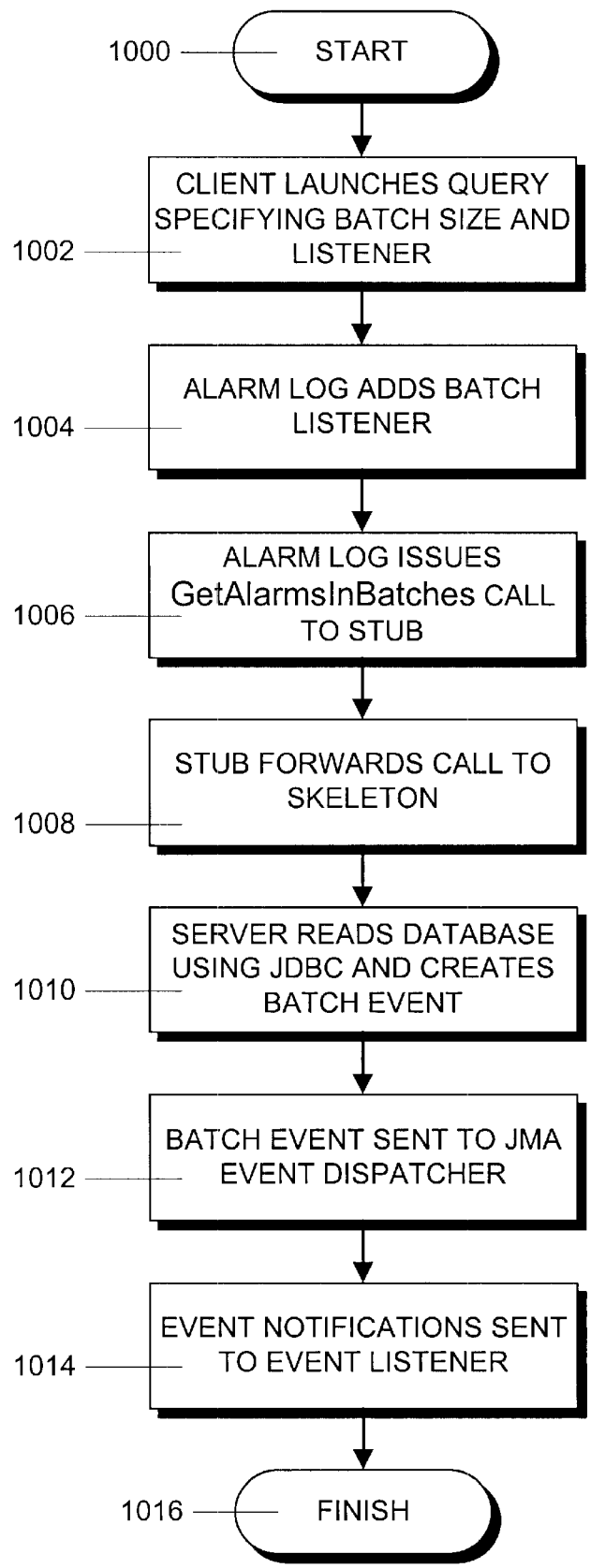
FIG. 10 is a flowchart illustrating the steps performed in servicing a batch request for alarm log records.

FIG. 10 is a flowchart which illustrates the steps involved in an asynchronous "batch" retrieval of alarm records. The process starts in step 1000 and immediately proceeds to step 1002. In step 1002, the client launches an alarm record query by invoking the getAlarmsInBatches( ) method in the AlarmLog object and specifying a query, the batchSize and a batchListener.

Next, in step 1004, the AlarmLog object adds a listener for the batch event to the AsyncJMAEventListener object by invoking the addAlarmsinBatchesListener( ) method in the AlarmLogSvc object.

In step 1006, the AlarmLog object forwards the getAlarmsinBatches( ) method call to the AlarmLogStub object which is part of the RMI transport system. The AlarmLogStub object then forwards this call to the AlarmLogSkel skeleton as set forth in step 1008.

In step 1010, the server reads the alarm log database via a conventional JDBC interface and creates one or more batch events. Each batch event is sent to the JMA EventDispatcher as shown in step 1012. In step 1014, the JMA EventDispatcher forwards a send_event( ) notification to the AsyncJmaEventListener object which is listening for batch events. The list of records is then transferred. This operation continues until all records obtained in response to the query have been transferred. The process then finishes in step 1016.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. An alarm services system for use in a distributed network management system having a management application program that is used by managers to control the system, a management information server and an alarm logging system which receives alarms and stores alarm records representing the alarms in a database, the alarm services system comprising:

a platform-independent interface in a client node, the platform-independent interface having remote objects which are accessible to the management application program and which contain method calls used by the management application program to retrieve and view alarm records;

an alarm services server running in a server node remote from the client node and having the management information server running therein, the alarm services server having object implementations for the remote objects, a mechanism for receiving notifications from the management information server and an interface for retrieving alarm records from the database; and an object transport mechanism connecting the interface to the alarm services server.

2. An alarm services system according to claim 1 wherein the alarm services server comprises an interface by which the alarm services server can perform a query on the database to retrieve selected alarm records.

3. An alarm services system according to claim 1 wherein the interface is written in the Java language.

4. An alarm services system according to claim 1 wherein the interface comprises at least one alarm log object which represents alarm records in the database.

5. An alarm services system according to claim 1 wherein the interface comprises a generic query object for constructing a query to retrieve alarm records from the database according to a user-defined sequence of logical operators.

6. An alarm services system according to claim 1 wherein the alarm services server comprises an event dispatcher object for receiving notifications from the management information server.

7. An alarm services system according to claim 6 wherein the interface comprises a listener object which receives event notifications from the event dispatcher object.

8. An alarm services system according to claim 7 wherein records retrieved from the database cause an event notification to be generated so that record retrieval can be carried out asynchronously.

9. An alarm services system according to claim 7 wherein the interface comprises at least one attribute object for representing attributes of an alarm record.

10. An alarm services system according to claim 9 wherein the interface comprises a query object which can generate a query based on the attribute object.

11. A method for use in a distributed network management system having a management application program that is used by managers to control the system, a management information server and an alarm logging system which receives alarms and stores alarm records representing the alarms in a database, the method comprising the steps of:

(a) creating a platform-independent interface in a client node, the platform-independent interface having remote objects which are accessible to the management application program and which contain method calls used by the management application program to retrieve and view alarm records;

(b) creating an alarm services server in a server node remote from the client node and having the management information server running therein, the alarm services server having object implementations for the remote objects, a mechanism for receiving notifications from the management information server and an interface for retrieving alarm records from the database; and (c) using an object transport mechanism to connect the interface to the alarm services server.

12. A method according to claim 11 wherein step (b) comprises the step of:

(b1) using an interface in the alarm services server to perform a query on the database to retrieve selected alarm records.

13. A method according to claim 11 wherein the interface is written in the Java language.

14. A method according to claim 11 wherein step (a) comprises the step of:

(a1) instantiating at least one alarm log object which represents alarm records in the database.

15. A method according to claim 11 wherein step (a) comprises the step of:

(a2) instantiating a generic query object for constructing a query to retrieve alarm records from the database according to a user-defined sequence of logical operators.

16. A method according to claim 11 wherein step (b) comprises the step of:

(b2) instantiating an event dispatcher object for receiving notifications from the management information server.

17. A method according to claim 16 wherein step (a) comprises the step of:

(a3) instantiating a listener object which receives event notifications from the event dispatcher object.

18. A method according to claim 17 further comprising the step of:

(d) causing an event notification to be generated when records are retrieved from the database so that record retrieval can be carried out asynchronously.

19. A method according to claim 17 wherein step (a) comprises the step of:

(a4) instantiating at least one attribute object for representing attributes of an alarm record.

20. A method according to claim 19 wherein step (a) comprises the step of:

(a5) instantiating a query object which can generate a query based on the attribute object.

21. A computer program product for use in a distributed network management system having a management application program that is used by managers to control the system, a management information server and an alarm logging system which receives alarms and stores alarm records representing the alarms in a database, the computer program product comprising a computer usable medium having computer readable program code thereon including:

program code for creating a platform-independent interface in a client node, the platform-independent interface having remote objects which are accessible to the management application program and which contain method calls used by the management application program to retrieve and view alarm records;

program code for creating an alarm services server in a server node remote from the client node and having the management information server running therein, the alarm services server having object implementations for the remote objects, a mechanism for receiving notifications from the management information server and an interface for retrieving alarm records from the database; and program code for creating an object transport mechanism to connect the interface to the alarm services server.

* * * * *